Nov. 12, 1968 W. V. RAUSCH ETAL 3,411,077

PROCESS FOR TESTING CORES BY DETERMINING AVERAGE MINIMUM RESTORE DIGIT CURRENT AND MAXIMUM DISTURB DIGIT CURRENT

Filed Nov. 9, 1964

INVENTOR.
WILLIAM V. RAUSCH
RICHARD J. PETSCHAUER
PETER L. MORAWETZ

BY Dugger, Braddock, Johnson & Westman

ATTORNEYS

United States Patent Office 3,411,077

Patented Nov. 12, 1968

3,411,077

PROCESS FOR TESTING CORES BY DETERMINING AVERAGE MINIMUM RESTORE DIGIT CURRENT AND MAXIMUM DISTURB DIGIT CURRENT

William V. Rausch, Richard J. Petschauer, and Peter L. Morawetz, Minneapolis, Minn., assignors to Fabri-Tek Incorporated, Minneapolis, Minn., a corporation of Wisconsin Filed Nov. 9, 1964, Ser. No. 409,686
11 Claims. (Cl. 324—34)

ABSTRACT OF THE DISCLOSURE

The method of testing magnetic core arrays comprising the steps of pulse testing each core to determine an average minimum restore digit current, again pulse testing each core to determine an average maximum disturb digit current, and comparing the ratio of disturb digit current to restore digit current to a predetermined quality factor.

This invention relates to thin film memory systems, and more particularly to a technique for maintaining high quality in the production of such systems.

Some of the most attractive elements or cores which can satisfy the recent demand for faster computer memory systems are constituted as thin magnetic films or film cores. Properties of magnetic film used as storage elements in computers are characterized by a number of magnetic parameters. Several of these parameters are affected or determined by the conditions under which the films are prepared. A constant check must be kept on actual film parameters as the films are made, both to reject unuseable films and to maintain proper conditions in the fabrication process. This invention provides a novel method for maintaining high yields of films with optimum magnetic parameters.

Thin film memory storage elements are bistable ferromagnetic films, typically measuring about 1 x 1.5 millimeters and between five hundred and two thousand angstroms thick. Various procedures for preparing such magnetic films may be used. One procedure giving consistently good results employs deposition of magnetic material from a metal source by evaporation in a vacuum. In vacuum deposition, the evaporation takes place in a bell jar evacuated to a presure on the order of $10^{-5}$ torr, or $10^{-5}$ mm. of mercury. The metal source can assume various forms and configurations depending upon the particular method of heating the material to be evaporated. In one case, a wire of the alloy to be deposited is wound on a tungsten filament, and the filament is heated by passing a current through it. In another method, chunks of alloy to be evaporated are bombarded by a stream of accelerated electrons, and the heat developed is used to evaporate the metal. A third method consists of radio frequency induction heating of the alloy in a ceramic crucible. Other techniques have been proposed and tried, mostly as combinations of the aforementioned procedures.

Once the metal has been evaporated, it condenses onto a dielectric or non-conducting substrate material which forms the supporting surface for the memory elements. These substrates play a very important role because they greatly influence the crystalline structure of the films, which determines to a large extent the films' magnetic behavior. It is important that the proper substrate temperature be maintained to improve adhesion of the film to the substrate, yet minimize chemical interaction between the thin films and the substrate which could adversely affect the magnetic properties of the films. During the evaporation process, the substrate temperature is maintained by any desired or usual means at approximately 350° C., and a magnetic field is applied parallel to the plane of the substrate. The purpose of the field is to induce uniaxial magnetic anisotropy in the films as they are deposited.

The combination of the heated substrate and the magnetic field is responsible (in some presently not understood way) for establishing a preferred axis of magnetization and other relevant magnetic properties in the deposited elements or cores. The preferred axis, or easy axis, is established in the direction of the applied magnetic field; a hard axis of magnetization is established in a direction transverse to that of the applied magnetic field.

For use as computer elements, it is essential that the thin films deposited on a substrate have optium magnetic characteristics and parameters. Various monitoring and control devices are included in the deposition apparatus to maintain the proper thickness of deposition, rate of deposition, proper alloy composition, and proper levels of other parameters.

For production economy, it is important to make as many cores as possible on each substrate. The entire assembly of substrate and cores is commonly called an array. However, since the substrates are usually of borosilicate glass or specially prepared metallic surface, it is impractical to remove a "bad" core from a substrate and replace it with a good one. Therefore, whenever even a single "bad" core occurs on a substrate, the entire array must be rejected. Thus, it is apparent that if arrays of any substantial size are desired, a very high level core quality reliability must be obtained. The large number of possible sources of error suggested above as well as other sources that are as yet not fully understood have in the past caused a very high array rejection rate.

After the arrays are manufactured, they are subjected to extensive testing, and arrays containing "bad" cores are rejected. The testing is primarily of two kinds. The first testing technique is hysteresis loop testing. In this technique, the characteristics of the hysteresis loop of the core are tested in various directions, with the substrate under a strain, and occasionally under other conditions. This hysteresis loop testing measures most of the relevant parameters in the core. However, there are other parameters that affect the operation of the cores which can not be measured by hysteresis loop testing.

In order to test the arrays for performance under the operating conditions of a memory system pulse testing has been used. Pulse testing tests the switching characteristics of each core under extreme operating conditions. A typical array may contain 36 words of thirteen digits each. The drive currents in such a memory system are typically 400 milliamps in the word lines and 160 milliamps in the digit lines. In order to test a particular core, one technique commonly used is to pulse the word line of an adjacent core with $10^6$ pulses of 400 milliamps each. Concurrently, the digit line of the test core is pulsed at 160 milliamps. After this series of pulses the core is switched and a pulse is read out. If the pulse is substantially below the nominal readout level, it may be concluded that the effects of switching the adjacent core at least partially destroyed the information in the core tested. This gradual demagnetization occurs by a process commonly called "creep," and a core that creeps excessively under the testing conditions must be rejected.

It is apparent that even a moderate yield of arrays of the typical size of 468 cores requires a very high level of reliability of the cores. Prior to this invention it was common for arrays of this size to have a yield of only about 30%, that is, only 30% of the manufactured substrates were deemed satisfactory after testing. It has been found that yields of 80% and higher may be obtained by employing the technique of this invention.

An object of this invention is to provide a method for increasing the yield of thin film arrays.

Another object of this invention is to provide a method for anticipating a reduction in the yield of thin film arrays during the fabrication process.

It is a further object of this invention to provide a method to optimize the magnetic parameters of thin film magnetic cores to provide a highly reliable thin film memory system.

It is a further object of this invention to provide a method for more rapidly and more accurately testing all of the relevant parameters of thin film magnetic cores.

Ideally, a thin film magnetic core with a thickness, for example, of approximately 1000 angstroms, will behave as a single magnetic domain. Thus, when a magnetic field is applied in the hard direction, atoms throughout the entire volume of the film change the direction of their magnetic axes coherently by means of an abrupt rotational motion. This process is called rotational switching and typically lasts only a few nanoseconds. Thus, it is apparent that if ideal rotational switching can be achieved, the speed of operation in a memory system can be greatly increased. In practice, however, thin film magnetic cores seldom have the characteristics of a single magnetic domain, but act as a small number of domains. The effect is that the switching time is very much shorter than that for domain wall switching or rotational switching in thick magnetic material but somewhat longer than that required for a single domain rotational motion.

Figure 2:
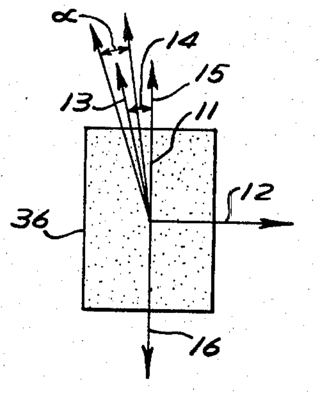
FIG. 2 shows a single thin film core with arrows indicating directions of magnetization.
Figures 3, 4:
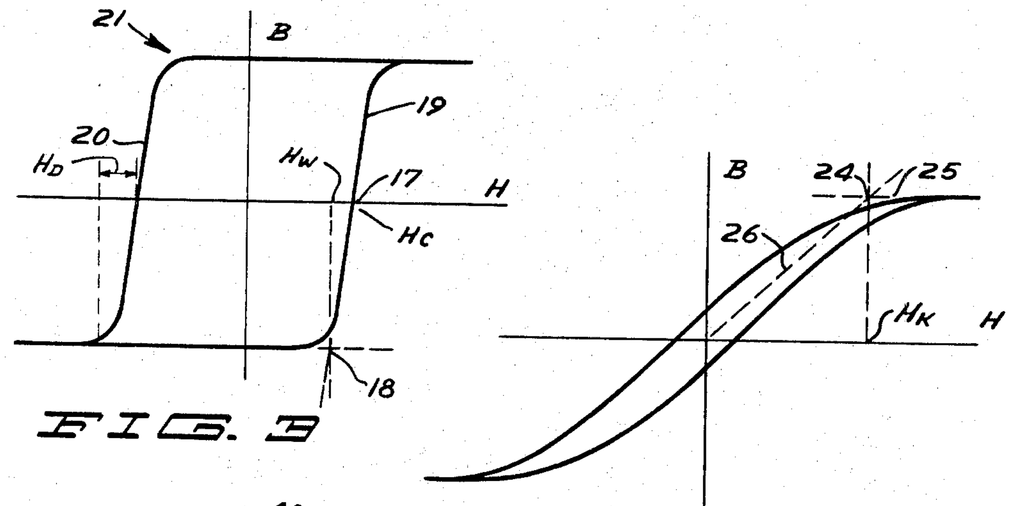
FIG. 3 shows the hysteresis loop of a thin film magnetic core taken in the easy axis direction.
FIG. 4 shows the hysteresis loop of a thin film magnetic core taken in the direction of the hard axis.

Thin film cores produced by the deposition process set out herein, have an easy axis of magnetization and a hard axis of magnetization perpendicular to the easy axis. A hysteresis loop taken along the easy axis of magnetization depicted at 11 in FIG. 2, of a core 36 is essentially square and is shown in FIG. 3. A hysteresis loop taken along the hard axis of magnetization depicted at 12 in FIG. 2 is nearly closed as shown in FIG. 4. The actual easy axis of magnetization shown at 13 in FIG. 2, is frequently at a slight angle 14 with the nominal or desired easy axis of magnetization 11. This angle 14 is commonly called the skew angle 14. A magnetostrictive memory film core will change its skew angle and also the shape of its hysteresis loop when subject to a strain. Since both of these factors may substantially affect the operation of the memory system, it is preferred that the film be non-magnetostrictive.

Studies have shown that thin film cores apparently do not have a single well defined easy axis of magnetization. Instead, there is a certain distribution of easy axes over a small angle $\alpha$ called the dispersion angle. For proper thin film magnetic core operation, it is important that the magnitude of the dispersion angle $\alpha$ be kept relatively small, typically 2 or 3 degrees.

The coercivity, $H_c$, is the longitudinal magnetic field which will cause a saturated film to become demagnetized. The value of the coercivity, $H_c$, is measured at 17, the value of H at the point the hysteresis curve crosses the H axis in FIG. 3. If $H_c$ is small, only a small magnetic field is necessary to reverse the direction of magnetization. If $H_c$ is too small, disturbing effects from adjacent circuitry may cause accidental switching and will make the memory element unreliable. If $H_c$ is too large, the "restore" or "write" currents from the memory address system may be insufficient to adequately switch the film.

The switching field $H_w$ is the strength of the magnetic field at which magnetic switching begins to occur. Because switching of the memory elements is typically a combination of domain wall switching and rotational switching, the hysteresis loop is curved at the point where switching begins. It is difficult to determine the exact point on the curve portion of the hysteresis loop where significant switching does begin, but a good approximation of $H_w$ is made by extending the upright side of the hysteresis loop to intersect the extended horizontal side of the hysteresis loop and measuring the magnetic field intensity along the horizontal from zero to the point of intersection 18 in FIG. 3. It is desirable that $H_w$ be as large as possible, and ideally it would equal $H_c$. If $H_w$ is small compared to $H_c$, the sides 19 and 20 of hysteresis loop 21 are more slanted. A relatively small $H_w$ also indicates poor stability of the thin film as a memory element, since disturbing effects from neighboring circuitry can partially demagnetize the element resulting in a loss of stored information.

The anisotropy field, $H_k$, represents the value of field intensity which is approximately sufficient to magnetize the film elements in the hard direction. In the manufacture of the thin film elements, it is desirable to keep $H_k$ as small as possible, since $H_k$ determines the strength of the output signal from the memory element when the element is switched from magnetization in the easy axis to magnetization in the hard axis. If $H_k$ is too large the film will not completely switch to the hard axis during a "read" operation and the output signal will be too small or nonexistent. $H_k$ is found in FIG. 4, from the intersection 24 of the horizontal tangent 25 of the hysteresis loop and the line 26 through the center of the loop having a slope equal to the average slope of the loop sides near the loop center. The value of H at the intersection 24 is the anisotropy field, $H_k$.

Another relevant magnetic parameter is the demagnetizing field $H_d$ also found in FIG. 3. It can be measured approximately by observing the slant of the vertical sides of the hysteresis loop. The demagnetizing field increases linearly with the thickness of the film. Since its average value must be kept to a fraction of the coercivity the demagnetizing field is the limiting factor in increasing the film thickness.

In order for a particular memory system to work satisfactorily, it is necessary that all of the above mentioned magnetic parameters for each film core be within a rather narrow predetermined range. These parameters may be measured by hysteresis display means. However, this method is difficult and frequently inaccurate. In addition, there are factors which affect the operation of the memory elements that do not readily appear from hysteresis measurements. Thus, for more accurate testing of memory systems, it has been found desirable to employ pulse testing as discussed above. In pulse testing, each memory element is subjected to conditions duplicating normal operating conditions. In this way, all possible parameters of the system are tested at the same time.

Figure 1:
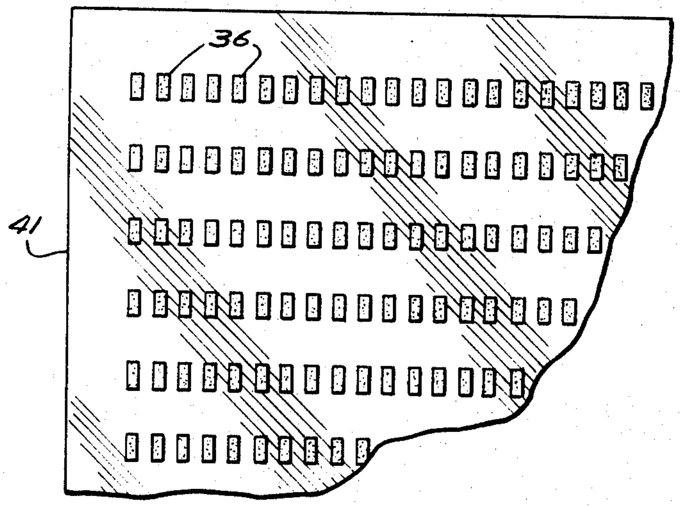
FIG. 1 shows an array of thin film memory elements or cores as they appear deposited on a substrate.
Figure 5:
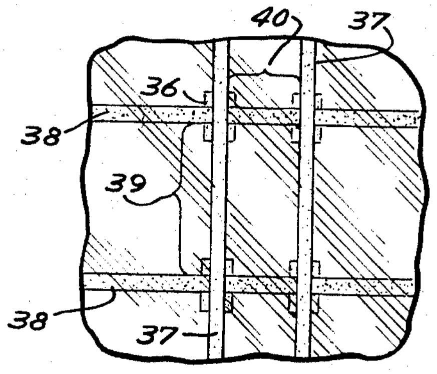
FIG. 5 shows a top plan view of a thin film memory array as it is related to the current lines in operation of a memory system.

In the typical thin film memory system, 468 cores, typically found on a substrate 41, as shown in FIG. 1, constitute with the substrate a magnetic memory array and are deposited so that their easy axes are parallel. A memory core 36 is shown in FIG. 5 in the presence of a word current line 37 running parallel to the easy axis 11, shown in FIG. 2, and a digit current line 38 running parallel to the hard axis 12. During the memory storage operation as seen in FIG. 5, a signal is stored when core 36 is magnetized in either direction along the easy axis 11 as indicated in FIG. 2. The stored information is read out of the core by applying first a current in the word line 37 which produces a magnetic field in a direction transverse to the easy axis of magnetization. The resulting effect is to rotate the magnetization of the core toward the direction of the hard axis 12 as indicated in FIG. 2. The flux change produced by the rotating magnetization induces an output voltage in a sense line which may be either the digit line 38 or a separate line running parallel to it and also adjacent core 36. The polarity of the output voltage depends upon the direction of initial magnetization of the core along the easy axis. After the core 36 has been magnetized along the hard axis 12, a current is applied in the digit line 38, thereby establishing a field parallel to the easy axis 11 and in a direction corresponding to either arrow 15 or arrow 16 depending upon the polarity of the digit line current. If the digit field is established in the direction of original magnetization along the easy axis, the digit field will return the core magnetization to its initial position. If the direction of the digit field is opposite to the direction of original magnetization, the core 36 will be magnetized in the reverse direction along the easy axis 11. The digit current is referred to as "restore" digit current if the core magnetization is returned to its original position and as "write" digit current if the core magnetization is driven in the opposite direction along the easy axis. However, for purposes of clarity of explanation, the digit current will be called "restore digit current" whenever it drives core magnetization back to the easy access, whether or not it is "restore" or "write" digit current.

Referring again to FIG. 5, the numeral 36 designates a thin film memory core. The word line 37 and the digit lines 38 cross at each core at right angles. In a typical operation as suggested above, the word drive current is 400 milliamps and the digit drive current is 160 milliamps. The spacing 39 along the word line is typically about three times the spacing 40 along the digit line. Drive current pulses in the word and digit lines induce spurious magnetic fields at the adjacent lines.

In the arrangement described above, the digit lines are sufficiently far apart and the digit drive current sufficiently low that the digit currents do not cause creep in cores in adjacent digit lines. However, the word drive currents are sufficiently large and the word lines are sufficiently close so that a 400 milliamp word drive pulse in a selected word line induces a magnetic field in cores in adjacent word lines equivalent to that produced by a 5 to 8 milliamp pulse in those lines. Thus, the core creep may be tested by pulsing fifteen milliamp pulses in a word line to simulate the induced field described above, and by simultaneously pulsing the digit lines. This method may be employed to test all thirty-six cores in a digit line at one time. This is done by pulsing a fifteen milliamp pulse on each word line simultaneous with a pulse of desired magnitude on the desired digit line. These pulses are repeated $10^6$ times. At a repetition rate of 100 kc. this requires ten seconds. Then, each core in the digit line is interrogated and the sense pulse read out. Whenever the readout sense pulse is below a predetermined level the core is determined to be bad under those conditions.

It has been found that periodic cleaning of the deposition equipment and the bell jar is necessary to maintain a high substrate yield. However, it has previously not been possible to predict when such a cleaning was necessary. Instead, it was necessary to wait until the yield had dropped substantially and then clean the instruments. This, of course, required a considerable waste of substrates which would have to be rejected before it was observed that the yield rate had dropped. Alternatively, it was possible to clean the bell jar and equipment very frequently, without waiting for the yield rate to drop. However, this required a considerable expenditure of time and chemicals to clean the equipment when it was often unnecessary. This invention provides a method for predicting a reduction in the yield rate before the reduction occurs.

In operation, it is desired that the cores may be switched with as low a current pulse as possible, yet that they resist switching or demagnetization from spurious or error currents in the system. The minimum current in the digit lines required for switching is determined by first writing into the cores a desired state, preferably opposite to the state under test. The cores are then tested by pulsing a four hundred milliampere pulse down the relevant word line and then 50 to 100 nanoseconds later but prior to the fall-time of the word pulse, pulsing a pulse down the relevant digit line. The word pulse rotates the axis of magnetization somewhat less than 90 degrees out of the easy axis. If the digit pulse is above the minimum margin it will if properly oriented, rotate the axis of magnetization fully to the opposite direction of the easy axis. If, after such a switching operation, a subsequent read operation reads out a sense pulse over 75% of the sense pulse read from a fully magnetized core, then it may be concluded that the digit pulse was sufficient for satisfactorily switching. After read-out, the core is reset to the original state. Successively smaller digit pulses are used in this operation until a subsequent readout produces a sense pulse less than 75% of the normal sense pulse (meaning the maximum output read-out of a standard reference element after being written using concurrent application of a 400 milliamp word pulse and a digit pulse which is used as a reference standard). The minimum digit current pulse which is found to be sufficient to switch the core satisfactorily is called the minimum restore digit current, and designated $I_{dr}$.

A second measurement ascertains the maximum disturbing digit current pulse to which the cores may be subjected without demagnetizing or switching the cores. In this test, after a write sequence is applied, a fifteen milliamp disturb pulse is pulsed down each of the word lines to simulate the worst-case effects of capacitive sneak currents, adjacent word line fringing effects, adjacent core interference and other spurious magnetic fields. A digit pulse of opposite polarity to the write sequence digit pulse is pulsed down relevant digit lines about 50 nanoseconds later than, but concurrent with the disturbed pulse. This sequence is repeated about $10^6$ times which is considerably more times than current may normally be induced in the lines between switching operations in a memory system. After the disturb pulses have been repeated $10^6$ times, the core is interrogated and a sense current pulse is read out. A sense current pulse readout less than 75% of the normal pulse is considered a basis for rejection. This process is repeated with successively higher digit pulse currents (a fixed digit write current is maintained) until the readout current pulse drops below the 75% margin. At this maximum level the disturb digit current is sufficient to creep the magnetization of the core and it is concluded that the core will not withstand a fifteen milliamp fringing current with digit currents in excess of this level. This maximum current level may be called the maximum disturb digit current and designated $I_{dd}$.

We have found it desirable to use a twenty milliamp word line test current to impose a more demanding test on the system. Under ideal deposition conditions the minimum restore digit current is approximately 90 milliamps and the maximum disturb digit current is 240 milliamps.

For purposes of this invention, the average values of $I_{dd}$ and $I_{dr}$ for all cores on a substrate are computed. The average values are designated $\overline{I_{dd}}$ and $\overline{I_{dr}}$.

Whenever the average restore digit current, $\overline{I_{dr}}$ rises above 115 milliamps or the average disturb digit current $\overline{I_{dd}}$ falls below 200 milliamps, it is concluded that the deposition process is not maintaining the desired standards and the system must be broken down and cleaned. This same technique can be used to maintain any reasonable values of $\overline{I_{dr}}$ and $\overline{I_{dd}}$, these values being primarily determined by design parameters of the memory system. Since the maximum allowable value for $\overline{I_{dr}}$ and the minimum allowable value of $\overline{I_{dd}}$ are proportionally related to one another, the ratio may be used for the general case. We have found that for proper operation and high reliability in the memory system, the ratio $\overline{I_{dd}}/\overline{I_{dr}}$ must be maintained not less than 1.74. The magnitude of this ratio is determined primarily by tolerable digit current variations designed into the memory system.

The method disclosed by this invention, therefore, is as follows: When each deposition is completed, the substrate is subjected to pulse testing of the cores, the values of $\overline{I_{dd}}$ and $\overline{I_{dr}}$ are thereby obtained for the substrate. The ratio $\overline{I_{dd}}/\overline{I_{dr}}$ is then calculated. Whenever the value of this ratio drops below a certain predetermined figure, such as 1.74, the deposition equipment is broken down and cleaned. However, since the ratio of $\overline{I_{dd}}/\overline{I_{dr}}$ decreases gradually as the contamination of the vacuum chamber gradually increases, an unusual deposition cycle yielding arrays exhibiting an unusually low ratio will not be misinterpreted as being caused by lack of chamber cleanliness. Such a sudden change will not therefore be considered a signal for the cleaning process.

One of the primary benefits of the technique of using $\overline{I_{dd}}$ and $\overline{I_{dr}}$ and their ratio is in the initial optimization of various deposition parameters, such as substrate temperature, rate of deposition, chamber pressure, presence and proportion of controlled impurities and trace elements, source composition, and substrate material. For example, if one wished to determine the optimum substrate temperature (that is, the one which would give the best yield and highest quality film elements regarding tolerance of drive current variations), one could experimentally determine how the ratio of $I_{dd}$ and $I_{dr}$ varies as a function of substrate temperature. Their ratio can be considered a figure of merit, and that temperature which maximizes this ratio would be the optimum value to use in a production process. A similar method can be used to optimize the other parameters such as those mentioned above.

What is claimed is:

1. In a deposition process in which a plurality of magnetic cores are deposited on substrates to form memory arrays, the method of determining whether to proceed with deposition on further substrates comprising the steps of:

(A) pulse testing each core on a precedent substrate to determine an average minimum restore digit current;

(B) pulse testing each core on said precedent substrate to determine an average maximum disturb digit current;

(C) and proceeding with deposition on subsequent substrates in the presence of a ratio of disturb digit current to restore digit current not less than a predetermined magnitude.

2. In a deposition process in which a plurality of magnetic cores are deposited on substrates to form memory arrays, the method of determining whether to proceed with deposition on further substrates comprising the steps of:

(A) pulse testing each core on a precedent substrate to determine an average minimum restore digit current;

(B) pulse testing each core on said precedent substrate to determine an average maximum disturb digit current;

(C) and proceeding with deposition on subsequent substrates in the presence of a ratio of disturb current to restore digit current not less than 1.74.

3. In a thin film magnetic memory array in which a plurality of cores are deposited along word lines and digit lines on a substrate, the method of testing the memory array for quality by determining the maximum usable digit disturb current comprising the steps of:

(A) subjecting the cores to a "write-in" sequence;

(B) pulsing the word lines with a simulated disturb pulse;

(C) pulsing the digit lines with a digit current pulse starting after but concurrent with the disturb pulse;

(D) pulsing the word lines with a read pulse after a series of steps B and C and measuring the magnitude of the resulting sense output pulses;

(E) and repeating steps A, B, C and D sequentially with successively larger magnitude digit current pulses in step C to determine the average maximum digit disturb current at which the sense output pulse of all cores is not less than a predetermined magnitude.

4. In a thin film magnetic memory array in which a plurality of cores are deposited along word lines and digit lines on a substrate, the method of testing the memory array for quality by determining the maximum usable digit disturb current comprising the steps of:

(A) subjecting the cores to a "write-in" sequence;

(B) pulsing the word lines with a simulated disturb pulse;

(C) pulsing the digit lines with a digit current pulse starting after but concurrent with the disturb pulse;

(D) pulsing the word lines with a read pulse after a series of steps B and C and measuring the magnitude of the resulting sense output pulses;

(E) and repeating steps A, B, C and D sequentially with successively larger magnitude digit current pulses in step C to determine the maximum digit disturb current at which the sense output pulse of all cores is not less than 75% of a normal sense output pulse.

5. In a thin film magnetic memory array in which a plurality of cores are deposited along word lines and digit lines on a substrate, the method of testing the memory array for quality by determining the minimum restore digit current comprising the steps of:

(A) subjecting the cores to a "write-in" sequence;

(B) pulsing the word lines with a normal switching current pulse;

(C) pulsing the digit lines with a digit current pulse starting after but concurrent with the switching current pulse;

(D) pulsing the word lines with a read current pulse and measuring the magnitude of the resulting sense output pulses;

(E) and repeating steps A, B, C and D sequentially with successively smaller digit current pulses to determine the minimum restore digit current at which the sense output pulse of each core is no less than a predetermined magnitude.

6. In a thin film magnetic memory array in which a plurality of cores are deposited along word lines and digit lines on a substrate, the method of testing the memory array for quality by determining the minimum restore digit current comprising the steps of:

(A) subjecting the cores to a "write-in" sequence;

(B) pulsing the word lines with a normal switching current pulse;

(C) pulsing the digit lines with a digit current pulse starting after but concurrent with the switching current pulse;

(D) pulsing the word lines with a read current pulse and measuring the magnitude of the resulting sense output pulses;

(E) and repeating steps A, B, C and D sequentially with successively smaller digit current pulses to determine the minimum restore digit current at which the sense output pulse of each core is no less than 75% of a normal sense output pulse.

7. In a deposition process in which a plurality of cores are deposited along word lines and digit lines on substrates to form memory arrays, the method of determining whether to proceed with deposition on further substrates comprising the steps of:

(A) subjecting the cores of said precedent substrate to a "write-in" sequence;
(B) pulsing the word lines on a precedent substrate with a normal switching current pulse;
(C) pulsing the digit lines on the precedent substrate with a digit current pulse;
(D) pulsing the word lines with a read pulse and measuring the resulting sense output pulses;
(E) repeating steps A, B, C and D sequentially with successively smaller magnitude digit current pulses to determine the minimum restore digit current at which the sense output pulses are above a first predetermined magnitude;
(F) subjecting the cores of said precedent substrate to another "write-in" sequence;
(G) pulsing the word lines with a simulated disturb current pulse;
(H) pulsing the digit lines with a digit current pulse;
(I) pulsing the word lines with a read pulse after a series of steps G and H;
(J) repeating steps F, G, H and I sequentially with successively larger magnitude digit current pulses to determine the maximum disturb digit current at which the sense output pulses are above a second predetermined magnitude;
(K) and proceeding with deposition on a subsequent substrate in the presence of a ratio of maximum disturb digit current to minimum restore digit current not less than a third predetermined magnitude.

8. In a deposition process in which a plurality of cores are deposited along word lines and digit lines on substrates to form memory arrays, the method of determining whether to proceed with deposition on further substrates comprising the steps of:
(A) subjecting the cores of said precedent substrate to a "write-in" sequence;
(B) pulsing the word lines on a precedent substrate with a normal switching current pulse;
(C) pulsing the digit lines on the precedent substrate with a digit current pulse;
(D) pulsing the word lines with a read pulse and measuring the resulting sense output pulses;
(E) repeating steps A, B, C and D sequentially with successively smaller magnitude digit current pulses to determine the minimum restore digit current at which the sense output pulses are above a first predetermined magnitude;
(F) subjecting the cores of said precedent substrate to another "write-in" sequence;
(G) pulsing the word lines with a simulated disturb current pulse;
(H) pulsing the digit lines with a digit current pulse;
(I) pulsing the word lines with a read pulse after a series of steps G and H;
(J) repeating steps F, G, H and I sequentially with successively larger magnitude digit current pulses to determine the maximum disturb digit current at which the sense output pulses are above a second predetermined magnitude;
(K) and proceeding with deposition on a subsequent substrate in the presence of a ratio of maximum disturb digit current to minimum restore digit current not less than 1.74.

9. In a deposition process in which a plurality of cores are deposited along word lines and digit lines on substrates to form memory arrays, the method of determining whether to proceed with deposition on further substrates comprising the steps of:
(A) subjecting the cores of said precedent substrate to a "write-in" sequence;
(B) pulsing the word lines on a precedent substrate with a normal switching current pulse;
(C) pulsing the digit lines on the precedent substrate with a digit current pulse;

(D) pulsing the word lines with a read pulse and measuring the resulting sense output pulses;
(E) repeating steps A, B, C and D sequentially with successively smaller magnitude digit current pulses to determine the minimum restore digit current at which the sense output pulses are not below 75% of a normal sense pulse magnitude;
(F) subjecting the cores of said precedent substrate to another "write-in" sequence;
(G) pulsing the word lines with a simulated disturb current pulse;
(H) pulsing the digit lines with a digit current pulse;
(I) pulsing the digit lines with a read pulse after a series of steps G and H;
(J) repeating steps F, G, H and I sequentially with successively larger magnitude digit current pulses to determine the maximum disturb digit current at which the sense output pulses are not below 75% of a normal sense output pulse magnitude;
(K) and proceeding with deposition on a subsequent substrate in the presence of a ratio of maximum disturb digit current to minimum restore digit current not less than a predetermined magnitude.

10. In a deposition process in which a plurality of cores are deposited along word lines and digit lines on substrates to form memory arrays, the method of determining whether to proceed with deposition on further substrates comprising the steps of:
(A) subjecting the cores of said precedent substrates to a "write-in" sequence;
(B) pulsing the word lines on a precedent substrate with a normal switching current pulse;
(C) pulsing the digit lines on the precedent substrate with a digit current pulse;
(D) pulsing the word lines with a read pulse and measuring the resulting sense output pulse;
(E) repeating steps A, B, C and D sequentially with successively smaller magnitude digit current pulses to determine the minimum restore digit current at which the sense output pulses are not below 75% of a normal sense output pulse;
(F) subjecting the cores of said precedent substrate to another "write-in" sequence;
(G) pulsing the word lines with a simulated disturb current pulse;
(H) pulsing the digit lines with a digit current pulse;
(I) pulsing the word lines with a read pulse after a series of steps G and H;
(J) repeating steps F, G, H and I sequentially with successively larger magnitude digit current pulses to determine the maximum disturb digit current at which the sense output pulses are not below 75% of a normal sense output pulse magnitude;
(K) and proceeding with deposition on a subsequent substrate in the presence of a ratio of maximum disturb digit current to minimum restore digit current not less than 1.74.

11. In a deposition process in which a plurality of cores are deposited along word lines and digit lines on substrates to form memory arrays, the method of determining whether to proceed with deposition on further substrates comprising the steps of:
(A) subjecting the cores on a precedent substrate to a "write-in" sequence;
(B) alternately and concurrently pulsing the word lines on said precedent substrate with a normal switching current pulse and pulsing the digit lines on the precedent substrate with successively smaller magnitude digit current pulses;
(C) applying a read pulse to each core following each pair of pulses in step B and measuring the resulting sense output pulses to determine the minimum restore digit current at which the sense output pulse of each core is not below a predetermined magnitude;

(D) subjecting the cores of said precedent substrate to a "write-in" sequence;

(E) applying a series of an alternate and concurrent pair of pulses to the word line and the digit line, the pair consisting of a simulated disturb current pulse and a digit current pulse, respectively, each successive series having an increased magnitude of digit current pulses over the preceding series;

(F) applying a read pulse to each bit following each series of the pair of pulses in step E and measuring the resulting sense output pulses to determine the maximum disturb digit current at which the sense output pulse of each core is not below the predetermined magnitude;

(G) and proceeding with deposition on a subsequent substrate in the presence of a ratio of maximum disturb digit current to minimum restore digit current not less than another predetermined magnitude.

References Cited

UNITED STATES PATENTS 3,249,926 5/1966 Ashley ------------- 340—174

FOREIGN PATENTS 251,031 5/1963 Australia.

OTHER REFERENCES

Myers, A. S. et al.: Testing Magnetic Core Planes, IBM Bulletin, vol. 1, No. 2, August 1958, pp. 21–22.

Raffel, J. I. et al.: Magnetic Film Memory Design; Proceedings of the IRE; January 1961, pp. 155–163.

Mossman, P.: Interaction Between Adjacent Cells in Magnetic Film Storage Matrixes, Proceedings of IEE, vol. III, No. 8, August 1964, pp. 1411–1416.

RUDOLPH V. ROLINEC, *Primary Examiner.*

R. J. CORCORAN, *Assistant Examiner.*